Patented Feb. 5, 1946

2,394,416

UNITED STATES PATENT OFFICE 2,394,416

TREATMENT OF ROSIN

Harold H. Zeiss, Paterson, N. J., assignor to Ridbo Laboratories, Inc., Paterson, N. J., a corporation of New Jersey No Drawing. Application February 15, 1943, Serial No. 475,960

4 Claims. (Cl. 260—106)

*General field and statement of objects*

This invention relates to treatment of rosin, and especially to treatment with certain treating agents promoting modification of the properties of rosin, such as softening or liquefaction and/or decarboxylation of the rosin.

As is known, gum or wood rosins contain mixtures of rosin acids, known today as abietic acid, pyro-abietic acid and d-pimaric acid amongst others. Such rosins commonly have an acid value of from about 145 to 185, usually from about 160 to 168, and in their natural state they are ordinarily hard, brittle materials, of melting point from about 70° C. to about 85° C.

Rosin is a valuable raw material for a number of commercial purposes, such as in paper sizing, soap manufacture, and especially in the coatings and plastics industries. There are, in fact, a number of examples in the art of use of various rosin derivatives for purposes such as those mentioned. Some of the most important and common examples occur in the coatings industry, i. e., use of rosin derivatives in paints, varnishes and the like.

In its natural state, however, rosin is not well suited to many commercial purposes for which it is potentially a valuable raw material.

The primary object of the present invention is to modify various physical properties of rosin, whereby to produce modified rosin products which are better adapted to many uses for which rosin or rosin derivatives are now employed. In addition, the modifications brought about in accordance with the present invention make it possible and advantageous to use the modified rosin products for many purposes for which rosin in its natural state and also various derivatives thereof are not well suited.

To illustrate, reference is made to coating compositions, such as varnishes. In its natural state, rosin is a brittle material and therefore yields a brittle film when employed alone as varnish solids. Thus, rosin in its natural state does not have film forming characteristics such that it may satisfactorily be employed alone as vehicle solids in a coating composition. According to this invention, modifications are brought about in the rosin so as to secure a rosin product having drying or film forming characteristics which are well suited to the coating composition industry, thereby even making possible employment of the modified rosin products alone as vehicle solids in varnishes and the like. Usually, however, at least some drying or semi-drying oil is advantageously used with the modified products, particularly where flexibility of the coatings is desired.

Because of the improved properties of the modified rosin products, such products may be employed as a replacement ingredient, in substantial proportions, for linseed or other drying or semi-drying oils in paints and other coating and plastic compositions.

For certain special purposes in the soap and paper sizing industries, the modified rosin products of this invention may also be of advantage, notwithstanding the fact that the modified products have a reduced acid value.

One of the most important modifications brought about by the process of the invention is the softening or liquefying of the rosin, i. e., at least some reduction of brittleness or in melting point, or both. In addition, the process of the invention is notable in its effect on the acid value, the invention providing for appreciable reduction in acid value, as will further appear. In referring to changes of this type and in making comparisons of the modified products with products not treated with modifying agents, it is to be understood that the statements regarding changes and comparisons are always made on the basis of a relation between the product treated with a modifying agent and a product treated in exactly the same manner (heating, etc.) but without a modifying agent. The latter is often herein referred to as a "blank" or "control" experiment.

According to the invention, by appropriate control of treatment conditions, the degree of softening or liquefaction and also of acid value may be regulated to meet various different requirements.

Although the invention is not limited thereto, it is of especial importance and advantage in accordance with the invention to subject the rosin to treatment for a time and under conditions such as to change the physical character of the rosin from its natural hard and brittle condition to a consistency approximating the so-called "cold flow," i. e., a consistency according to which the material will gradually flow at normal room temperatures, so that if a blob of the modified rosin is placed on a flat surface, it will more or less gradually flatten out, often at a rate which is not observable with the eye. For many purposes a liquefaction at least to this degree is desirable.

For certain purposes it is advantageous that the rosin be liquefied even to the extent of becoming a mobile liquid, similar, for instance, to the consistency of certain oils, such as bodied linseed oil.

My preferred range of liquefaction extends from about the consistency of a viscous oil to about the cold flow consistency above mentioned, although it is to be understood that a greater or a lesser degree of liquefaction is also contemplated.

The modification process

The process of the invention involves heating the rosin the the presence of metallic zinc, the duration of heating, temperature and other treatment conditions, as more fully explained herebelow, being controlled in accordance with the extent and type of modification desired.

Preferably zinc is employed in finely divided form, as a powder or dust. The fineness of subdivision of the zinc is of advantage in promoting more rapid action during the process.

In carrying out the process, the rosin in heated between about 250° C. and about 320° C., preferably upwards of about 270° C. A temperature of about 290° C. to 310° C. has been found to yield very good results under most circumstances. The temperature may, of course, be varied depending upon a number of factors, including other treatment conditions. It is of importance that the treatment temperature be kept below the point at which any substantial decomposition or distillation occurs.

Anywhere from a trace, for instance, .01% or .1% up to about 10%, of the zinc dust may be employed, although I have found a particularly advantageous range to be from about .1% to about 5%. More than about 3% of zinc dust frequently leaves unreacted zinc as a sediment.

Thorough dispersion of the modifying agent in the rosin is of importance and appropriate control of temperature and time both contribute to bringing about such thorough dispersion. Agitation may also be employed as an aid to securing thorough dispersion of the modifying agent. Usually not more than a few hours treatment on temperature will be found sufficient, for instance, from about one hour to about five hours, although in some cases, the reaction proceeds very rapidly, requiring not more than about one half hour.

Another important consideration is that the reaction is preferably carried out in the absence of air, or out of contact with any substantial quantity of air. For this purpose the reaction may be carried out in a closed vessel, though not necessarily under a positive pressure, so that the gases or fumes of the reaction released from the modifying agent serve to exclude the air.

Vacuum is also effective for the purpose of excluding air and, in addition, reduction in contact of air may be brought about by blanketing the surface of the reaction mixture with some inert gas, such as $SO_2$, $CO_2$, or nitrogen. Where vacuum is used, a pressure, for instance, of about 100 mms. Hg to about 450 mms. Hg will be found effective, although higher or lower pressure may also be used. Whatever means or procedure is employed, it is of advantage to so conduct the process as to reduce oxygen concentration in the reaction vessel and prevent entrance of fresh air or oxygen to the reaction mixture. For some purposes it may be advantageous to operate at super atmospheric pressure.

Some more or less general considerations regarding the process should be noted, as follows:

Apparently, during the initial portion of the reaction, the metallic zinc reacts with rosin acids present, thereby forming rosin soaps. Soap formed apparently goes into solution shortly after formation thereof, and after a short time, upon cooling of the reaction mixture, the product will be found to be appreciably softened as compared with the initial untreated material.

Changes in other physical characteristics also take place, including especially reduction in acid number.

The final product is of quite light color, which is of advantage for many purposes.

If large quantities of zinc dust are employed, appreciable quantities of zinc soap may be formed, i. e., zinc rosinate, which soap has a relatively high melting point and may therefore, in part, counteract the liquefying or softening action of the treatment. The softening action of the zinc is nevertheless quite pronounced and end products of quite soft consistency may be secured by employment of the zinc powder, provided the quantity is not too high.

In considering the nature of the modifications, it is to be noted that, while some small loss in weight may occur by volatilization (usually not more than about 15-20%), no appreciable fractional or destructive distillation takes place. With appropriate precautions to avoid distillation the process can usually be carried out without loss of more than 10% or 15%, such small loss as does occur usually comprising water, $CO_2$, etc., at least in major part. As a precaution, the temperature should be kept below the boiling or distillation point of the main reaction product, under the applied reaction conditions of the process. By this precaution, destructive distillation or cracking is positively avoided.

Whatever the exact nature of the chemical, colloidal and/or physical changes which are brought about, in general, the treatment provided in accordance with the present invention reduces the acid value of the modified product and also softens or liquefies the material. These changes, together with others which usually take place, such as imparting drying characteristics to the rosin, and improving film forming properties of the modified products as compared with untreated rosin in the absence of other vehicle solids, for instance, make possible or practicable use of my modified rosin products for many purposes for which rosin in its natural state is not suited, or at least not well adaptable, and for which many known rosin derivatives are likewise not satisfactory.

In considering the starting material on which the process may be employed, it is first noted that the process brings about changes both of a physical or colloidal, and also of a chemical nature. It is important, however, to bear in mind that the process essentially involves a reaction with the rosin molecule, that is, with the type of molecules of which the basic constituents of natural rosin are composed. Therefore, while rosin itself, such as gum or wood rosins, represents perhaps the most important starting material to which the process is adaptable, it is noted that the process may be employed on rosin which has been pretreated in various ways, or on mixed or chemically condensed materials incorporating rosin, since the reaction will take place wherever the rosin molecule is present provided, of course, that the physical or chemical state or "environment" of the rosin molecule is not such as to prevent the reaction from taking place.

It may also be mentioned that there are other natural resins, such as copals, which act similarly to rosin by treatment in accordance with this invention. In fact, the reaction may be carried out on any of the natural resins containing high molecular resin acids. Therefore, whenever any such other natural resin behaves similarly to rosin, it is herein considered as an equivalent.

Copals are fossil gums which have to be "fused" before becoming soluble in organic solvents and miscible with fatty oils. When copals, for instance Congo copals, are used in the present process, they should be employed in the fused state.

Examples

In all of the examples given below, WW wood rosin (Newport Industries) was employed. In all cases a batch of 1,000 grams of the rosin was heated together with the zinc (in powder form) in a 3-liter distilling flask.

Temperatures referred to herebelow are all given in degrees centigrade.

The melting point of the products was determined by the mercury method, the iodine determinations being made according to the Wijs method.

Comparative Examples 1–4

In a comparative series of examples, each example was conducted under the same treatment conditions, so as to secure comparative results, the one variable being the quantity of zinc dust employed.

In this series of examples, a temperature of 290° C. was employed and the batch was maintained at that temperature for 5 hours, the pressure being 400 mms. Hg.

For the sake of further comparison, a similar batch (1,000 grams) of the same rosin (WW wood) was heated as a "blank" experiment (see A in the table below), under the conditions above specified, but without the presence of the zinc dust.

Certain characteristics of the initial untreated rosin are included in the following table—see item B.

the above examples, and especially in Example 1 employing 5% of zinc dust that during about the first hour at the treatment temperature, the batch indicated the presence of lumps of zinc and probably of a zinc soap formed in situ with rosin acids present. After about 2 hours, the mixture cleared and the lumps dissolved in the mass, except for a small residue which remained at the bottom of the vessel at the end of the treatment.

All of the products of Examples 1–4 were of quite light color, i. e., light brown, some of them having a grayish or greenish tint, as compared with the untreated material.

Little if any residue remained after treatment, in the case of Examples 2, 3 and 4.

Example 5

This example was conducted under similar conditions to those above, except for differences as mentioned below.

In this example a batch of 1,000 grams of WW wood rosin was heated for 5 hours at 270° C. with 5% of zinc dust, the pressure being 100 mms. Hg. At the end of this 5 hour treatment period, the product apparently contained a large amount of soap (zinc rosinate) which was not molten at the reaction temperature and had not gone into solution in the rosin. A portion of the product was poured off and this portion had a melting point at 60° C., acid number 91, saponification number 108 and iodine number 194. This first product was of a gray-green color.

The remainder of the batch, containing a large quantity of soap, was then heated for 1¼ hours at a somewhat higher temperature, between about 290° C. and 310° C., the pressure now being 760 mms. Hg (atmospheric). By this additional heating the soap present apparently went into solution in the rosin and the final product was slightly plastic and of medium brown color, with a melting point at 63° C., acid number 90, saponification number 100 and iodine number 182.

I claim:

1. A process for making a decarboxylated and softened rosin product from hard and brittle

*Table of comparative examples*

| Ex. No. | Zinc dust | Melting point, degrees, C | Acid No. | Sapon. No. | Iodine No. | Consistency |
|---|---|---|---|---|---|---|
| 1 | 5% | | 58 | 72 | 174 | Plastic. |
| 2 | 2% | | 71 | 77 | 182 | Do. |
| 3 | 0.5% | | 87 | 102 | 174 | Do. |
| 4 | 0.1% | 54 | 114 | 127 | 184 | Very slightly plastic. |
| A | (Heated without agent) | 68 | 130 | 133 | 151 | Brittle solid. |
| B | (Untreated) | 81 | 169 | 173 | 206 | Do. |

The designations under the consistency column may be further explained and amplified as follows:

Solid=Consistency harder than that on which an impression can be made with the finger nail.

Slightly plastic=Consistency such that an impression can be made with the finger nail, sometimes also displaying some degree of "cold flow."

Plastic=Consistency such that the material may with ease be deformed with the finger and manifesting free "cold flow" characteristics.

No melting point determinations were made on "plastic" products because of the impracticability of securing accurate results.

It may be noted in connection with various of rosin, which process comprises incorporation in the rosin up to about 5% of metallic zinc, and heating the mixture out of contact with the atmosphere between about 250° C. and about 320° C., but not above the temperature at which appreciable destructive distillation occurs under the conditions of the treatment, the time and other conditions of treatment being such as to extensively decarboxylate the rosin and to reduce the melting point of the rosin as compared with the decarboxylation and reduction of melting point of the same rosin heated to the same temperature under the same treatment conditions but without a modifying agent.

2. A process in accordance with claim 1 in which the zinc is employed in dust form.

3. A process for making a decarboxylated and softened rosin product from hard and brittle rosin, which process comprises incorporation in the rosin of from .1% to 5% of metallic zinc in dust form, and heating the mixture out of contact with the atmosphere between about 290° C. and about 310° C., but not above the temperature at which appreciable destructive distillation occurs under the conditions of the treatment, the time and other conditions of treatment being such as to extensively decarboxylate the rosin and to reduce the melting point of the rosin as compared with the decarboxylation and reduction of melting point of the same rosin heated to the same temperature under the same treatment conditions but without a modifying agent.

4. A process for making a decarboxylated and softened rosin product from hard and brittle rosin, which process comprises incorporation in the rosin of from about 0.1% to about 10% of metallic zinc in dust form, and heating the mixture out of contact with the atmosphere between about 270° C. and 320° C., but not above the temperature at which appreciable destructive distillation occurs under the conditions of the treatment, the time and other conditions of treatment being such as to extensively decarboxylate the rosin and to reduce the melting point of the rosin as compared with the decarboxylation and reduction of melting point of the same rosin heated to the same temperature under the same treatment conditions but without a modifying agent.

HAROLD H. ZEISS.